Dec. 13, 1949 R. D. LAMBERT ET AL 2,490,819
MAKING LAMINATED LUMBER
Filed June 2, 1947 11 Sheets-Sheet 1

Robert D. Lambert
Daniel W. Smith
INVENTORS

BY Arthur K. Davis
ATTORNEY

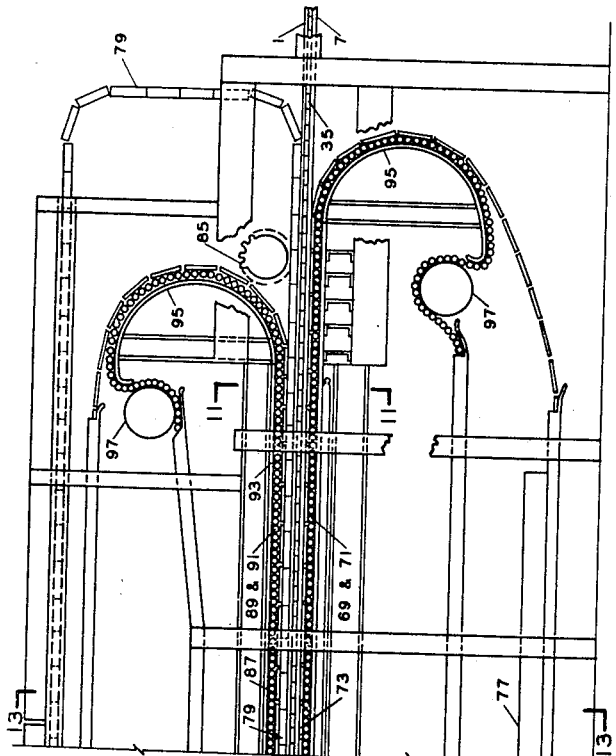
FIG. 3
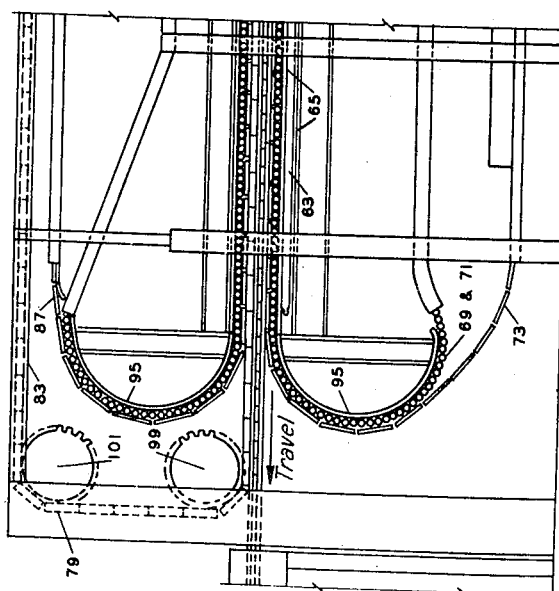
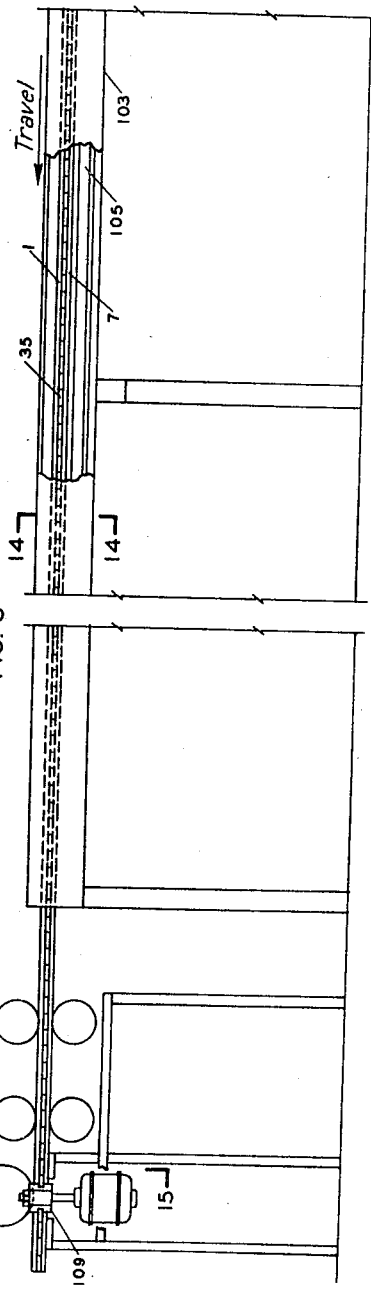
FIG. 4
Robert D. Lambert
Daniel W. Smith
INVENTORS
BY Arthur L. Davis
ATTORNEY Dec. 13, 1949     R. D. LAMBERT ET AL     2,490,819
MAKING LAMINATED LUMBER
Filed June 2, 1947                                                             11 Sheets-Sheet 3
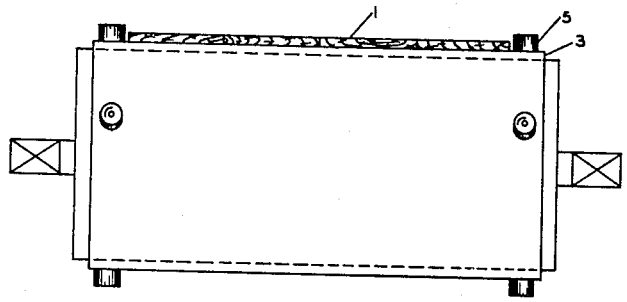
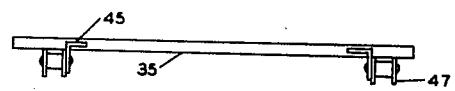
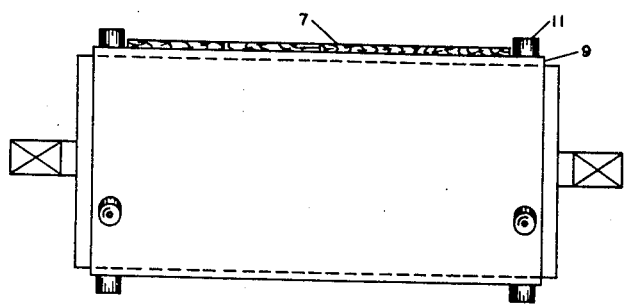
FIG. 5
Robert D. Lambert
Daniel W. Smith
INVENTORS
BY *Arthur T. Davis*
ATTORNEY Dec. 13, 1949     R. D. LAMBERT ET AL     2,490,819
MAKING LAMINATED LUMBER
Filed June 2, 1947                                    11 Sheets-Sheet 5
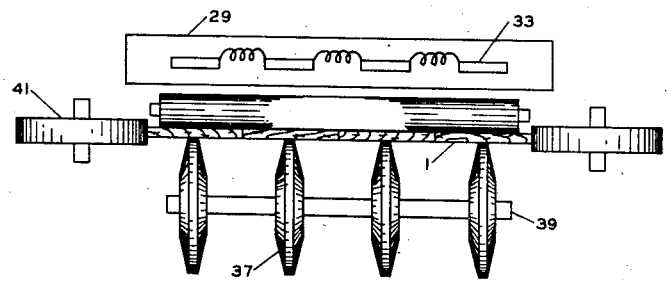
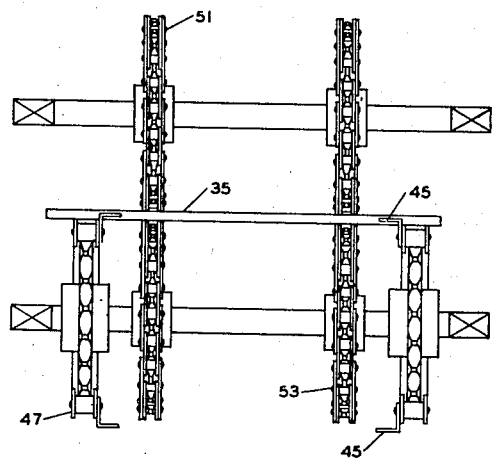
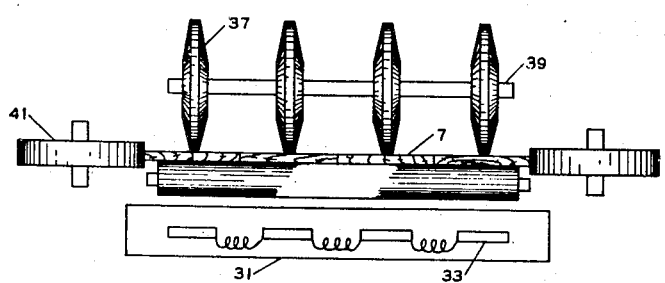
FIG. 7
Robert D. Lambert
Daniel W. Smith
INVENTORS
BY
ATTORNEY Dec. 13, 1949 R. D. LAMBERT ET AL 2,490,819
MAKING LAMINATED LUMBER
Filed June 2, 1947 11 Sheets-Sheet 6

Robert D. Lambert
Daniel W. Smith
INVENTORS

BY Arthur F. Davis
ATTORNEY

Dec. 13, 1949   R. D. LAMBERT ET AL   2,490,819
MAKING LAMINATED LUMBER
Filed June 2, 1947   11 Sheets-Sheet 8

Robert D. Lambert
Daniel W. Smith
INVENTORS

BY
ATTORNEY

Dec. 13, 1949  R. D. LAMBERT ET AL  2,490,819
MAKING LAMINATED LUMBER
Filed June 2, 1947  11 Sheets-Sheet 9

Robert D. Lambert
Daniel W. Smith
INVENTORS

BY Arthur L. Davis

ATTORNEY

Dec. 13, 1949 R. D. LAMBERT ET AL 2,490,819
MAKING LAMINATED LUMBER
Filed June 2, 1947 11 Sheets-Sheet 10

Robert D. Lambert
Daniel W. Smith
INVENTORS

BY *Arthur L. Davis*
ATTORNEY

Dec. 13, 1949   R. D. LAMBERT ET AL   2,490,819
MAKING LAMINATED LUMBER
Filed June 2, 1947   11 Sheets-Sheet 11

Robert D. Lambert
Daniel W. Smith
INVENTORS

BY Arthur L. Davis
ATTORNEY

Patented Dec. 13, 1949

2,490,819

UNITED STATES PATENT OFFICE 2,490,819

MAKING LAMINATED LUMBER

Robert D. Lambert and Daniel W. Smith, Knoxville, Tenn., assignors to Tennessee Valley Authority, a corporation of the United States Application June 2, 1947, Serial No. 751,942

4 Claims. (Cl. 154—133)

(Granted under the act of March 3, 1883, as amended April 30, 1928; 370 O. G. 757)

The invention herein described may be manufactured and used by or for the Government for governmental purposes without the payment to us of any royalty thereon.

This invention relates to an apparatus for and a process of making laminated lumber, particularly making laminated lumber from wooden slats of substantial thickness rather than from thin wooden veneer.

The principal developments of this art have been directed to the production of laminated lumber made up of a considerable number of veneer plies. The present development is directed to the utilization of waste wooden products the dimensions of which are not suitable for the production of veneer-like elements. However, such waste products may be milled to produce slats of different lengths. Although slats of various thickness may be produced, it is of course necessary to use the same thickness in any one of the plies and it is generally desirable to use the same width of slat in the standard production of any particular dimension of laminated lumber. As far as is known, there is no method or apparatus in the art which makes it possible to produce laminated lumber from such slats of random length.

The principal object of the present invention is to provide an apparatus for and a method of producing laminated lumber as a suitable material of construction from waste wood products which are otherwise unsuitable for any such use. Another object of this invention is to provide an apparatus for and a method of producing laminated lumber from wooden slats. A further object of this invention provides a continuous apparatus for and continuous method of producing laminated lumber from wooden elements of a thickness substantially greater than that of thin, flexible sheets of wood veneer. Other objects of this invention include the provision of an apparatus for and a method of economically producing laminated lumber which may have decorative characteristics as well as suitable structural properties.

In the present invention, the apparatus for making three-ply laminated lumber from wooden slats comprises the combination of means for separately assembling and advancing to conveyance a top and bottom layer of laterally contiguous longitudinal slats and a core layer of laterally contiguous transverse slats, means for locally heating a restricted area of the top and bottom of said core layer, means for applying a thermo-setting cement to the bottom of the top layer and the top of the bottom layer in restricted zone spaced from the surface of the heated core layer, means for locally heating a restricted area of the top of the top layer and bottom of the bottom layer opposite the respective areas to which said cement has been applied, and a continuous press comprising means for advancing the converged layers therethrough, means for heating at least one face of the juxtaposed layers through its contact with one side of the conveying means for advancing said layers therethrough, and means for subjecting said juxtaposed layers to both vertical and lateral pressure within said press.

In addition, the present invention is directed to a continuous process for making three-ply laminated lumber from wooden slats by assembling a top layer of contiguous longitudinal slats, by assembling a core layer of contiguous transverse slats, by assembling a bottom layer of contiguous longitudinal slats, by continuously moving said separated layers so as to converge into juxtaposition at the entrance of a pressure zone, by heating the separated layers of slats, by applying a thermo-setting cement between the layers of slats preceding their convergence into said pressure zone, by applying vertical and lateral pressure on the juxtaposed slat layers within said pressure zone, by maintaining the assembled slat layers moving through said pressure zone under the influence of pressure and temperature therein for a time sufficient to hold the cemented layers as an integral unit upon release of pressure therefrom, and by withdrawing the laminated lumber so produced from said pressure zone.

In the accompanying drawings, which form a part of the specification and wherein reference symbols refer to like parts wherever they occur, Fig. 1 is a plan view of a feeding mechanism of one form of apparatus for the embodiment of the present invention.

Fig. 3 is a side elevational view of a continuous glue press proper for the further processing of work assembled, preheated and coated with glue as shown in Fig. 2.

Fig. 4 is a side elevational view of apparatus for the final processing of the glued work produced by the continuous press shown in Fig. 3.

Fig. 5 is an end elevational view, through 5—5 of Fig. 2, showing details of conveyors for assembling the top, center and bottom layers of slats, respectively.

Figure 1:
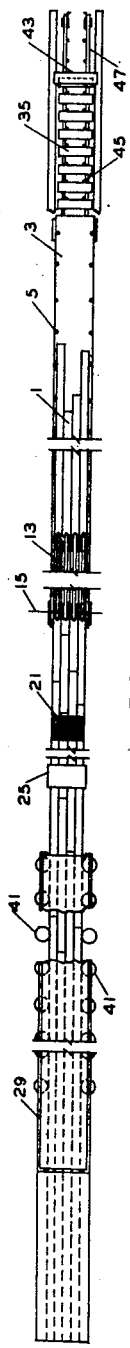
Figure 2:
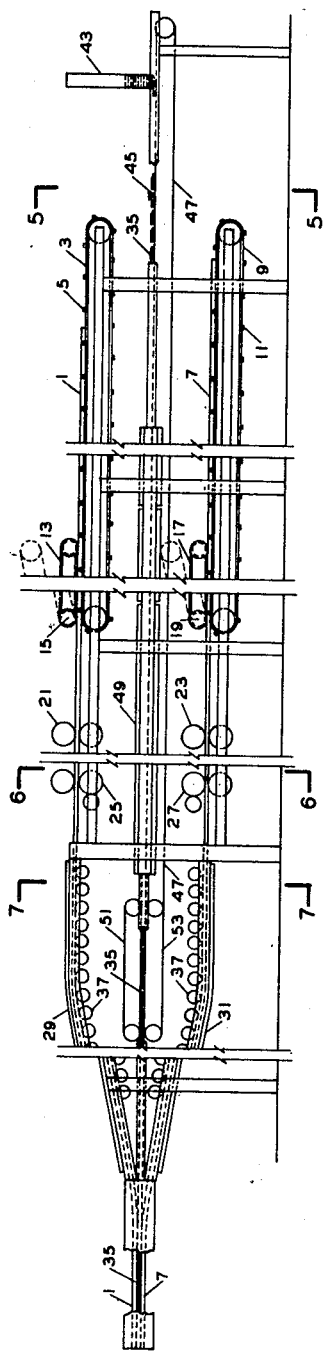
Fig. 2 is a side elevational view of the feeding mechanism shown in Fig. 1.
Figure 6:
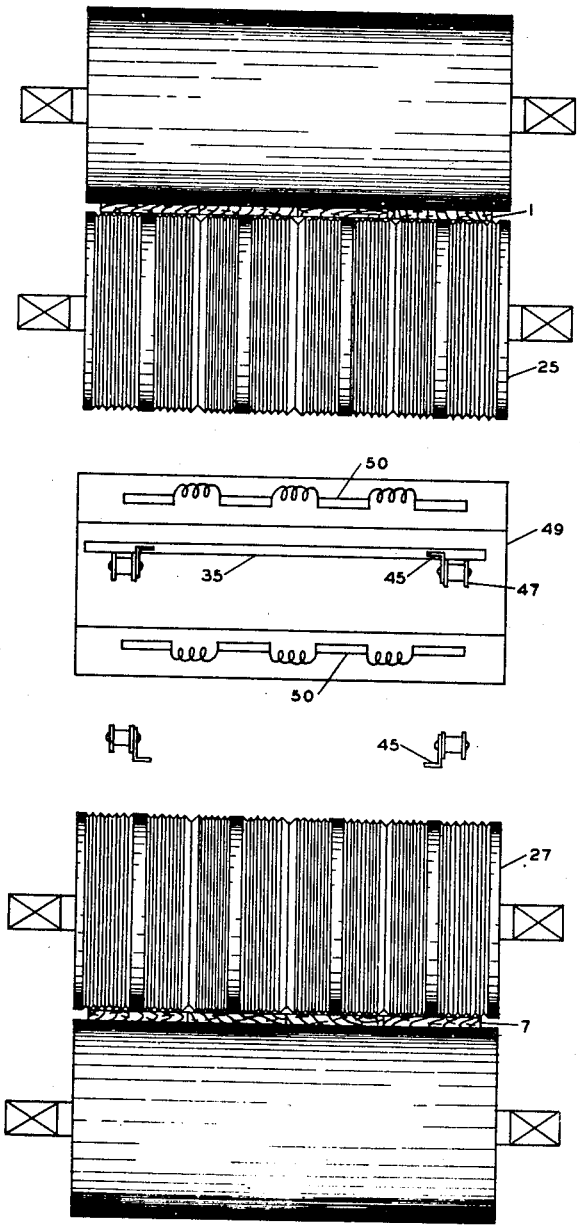

Fig. 6 is an end elevational view, through 6—6 of Fig. 2, showing details of the glue spreader for the top ply, the heater for the center ply and the glue spreader for the bottom ply.

Fig. 7 is an end elevational view, through 7—7 of Fig. 2, showing details of the heaters for the top and bottom plies of slats, and an end view of the device for forcing the center ply slats in close juxtaposition.

Figure 8:
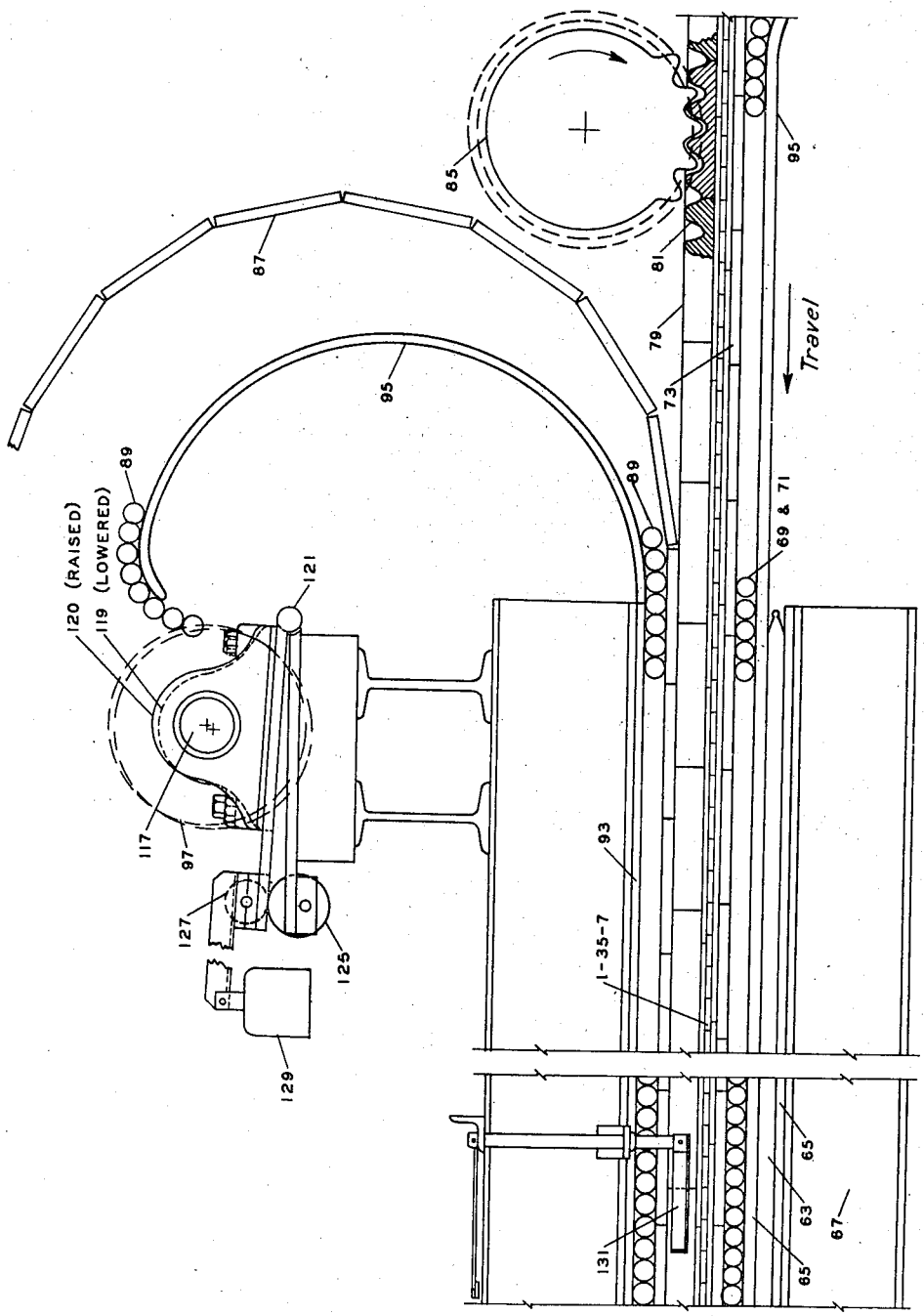

Fig. 8 is a side elevational view showing details of the steering device which controls the travel of the converged plies of slats through the continuous press shown in Fig. 3.

Figure 9:
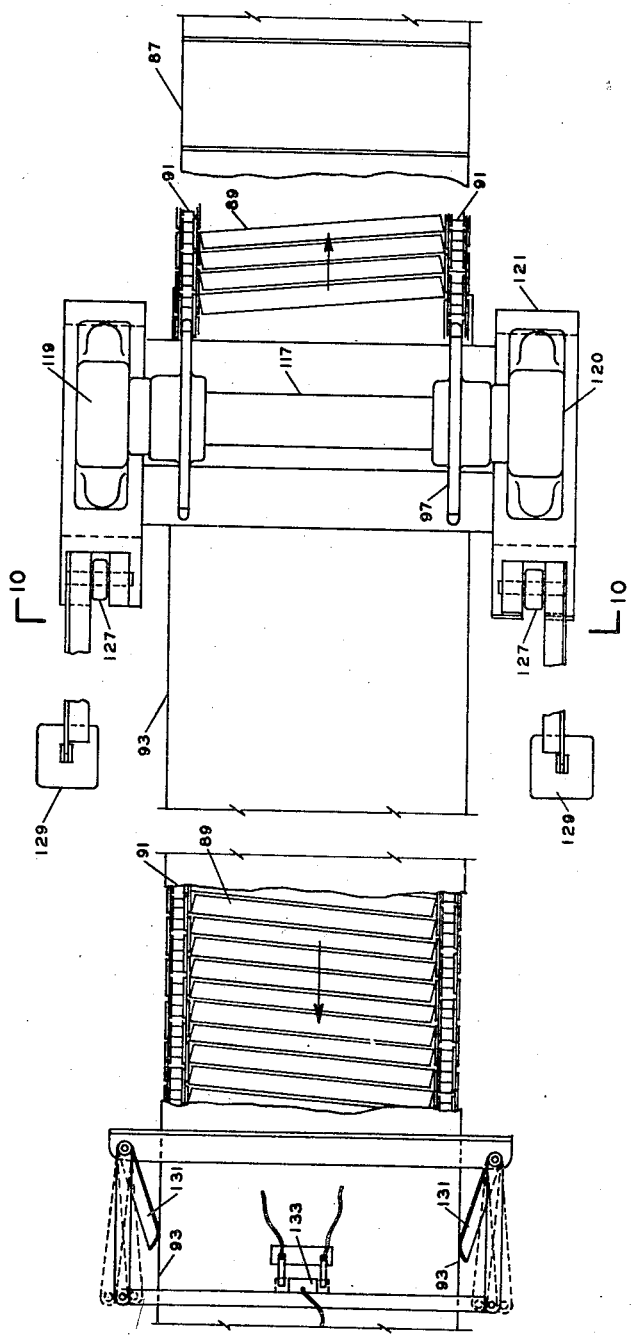

Fig. 9 is a plan view of the steering device shown in Fig. 8.

Figure 10:
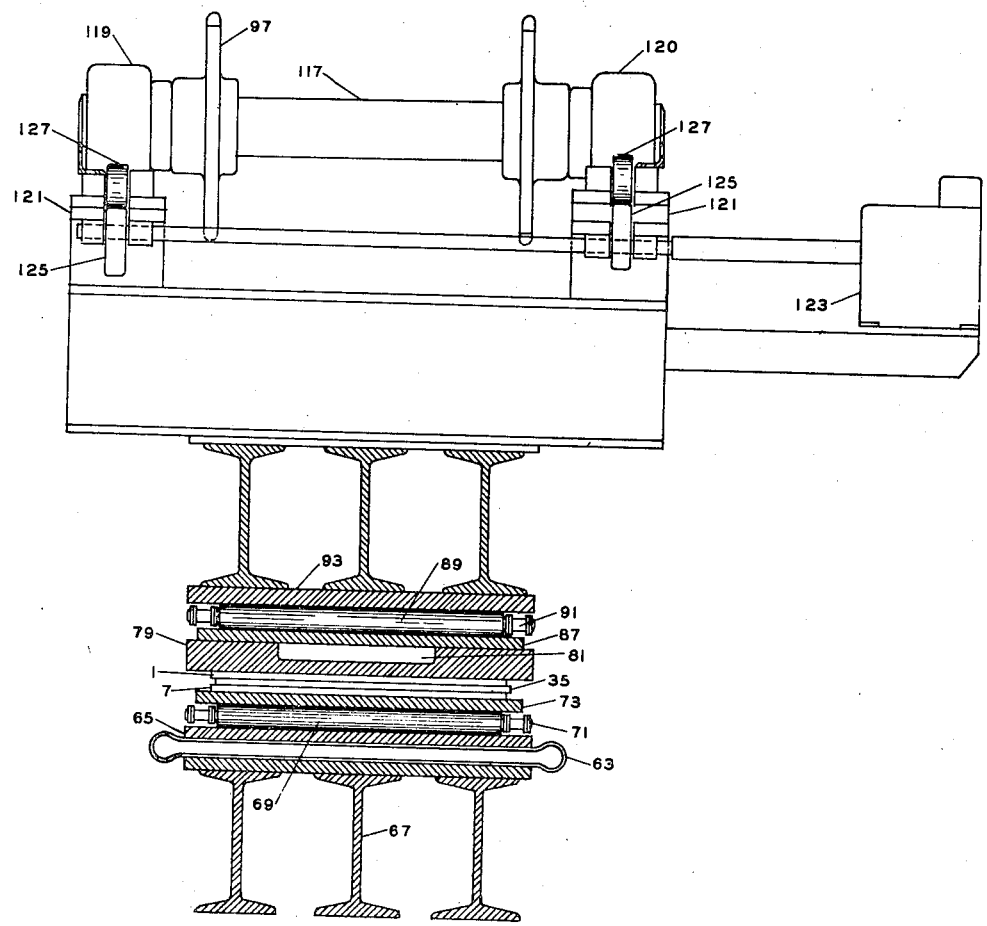

Fig. 10 is an end elevational view of the steering device taken through 10—10 of Fig. 9.

Figure 11:
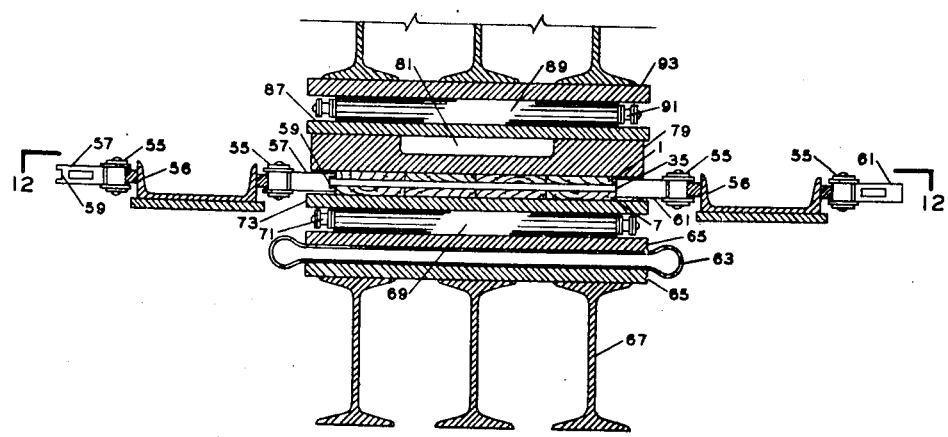

Fig. 11 is an end elevational view, through 11—11 of Fig. 3, showing details of the side pressure mechanism.

Figure 12:
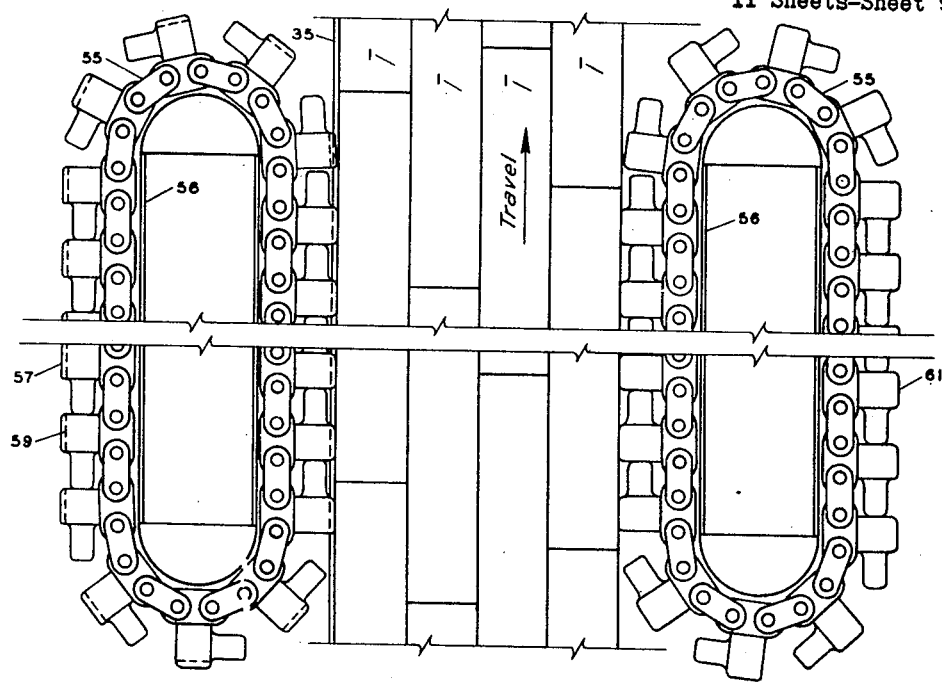

Fig. 12 is a plan view through 12—12 of Fig. 11.

Figure 13:
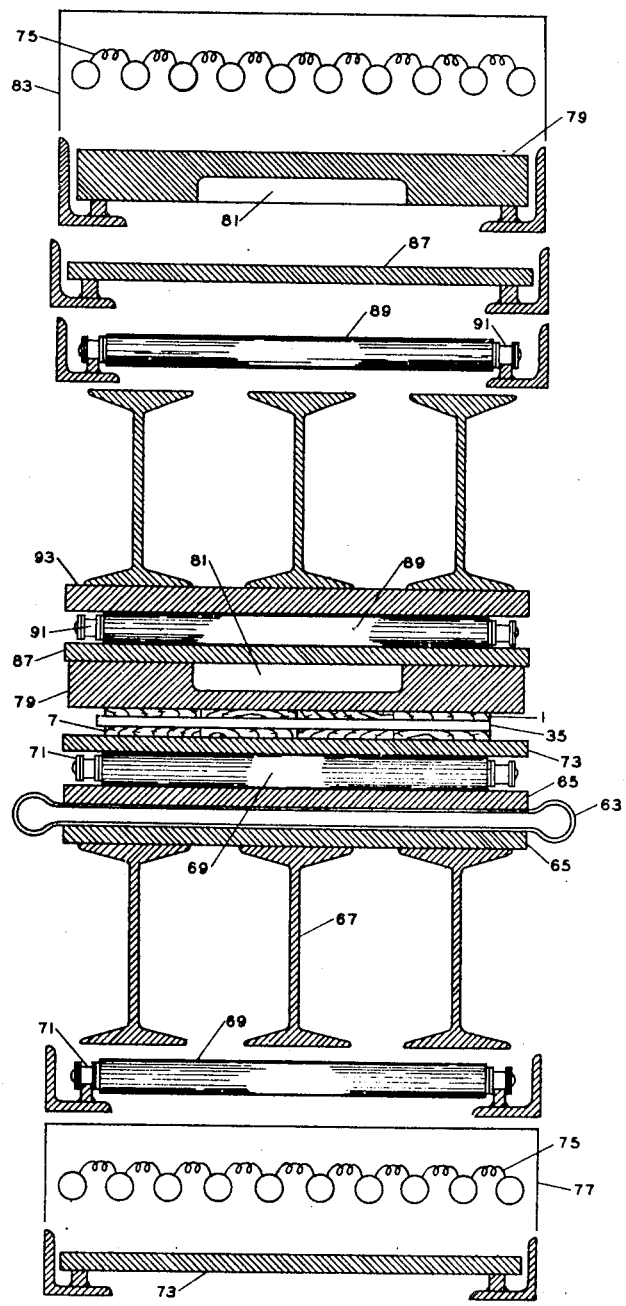

Fig. 13 is an end elevational view, through 13—13 of Fig. 3, showing details for the external heating of platens and apparatus for the vertical application of pressure in the press.

Figure 14:
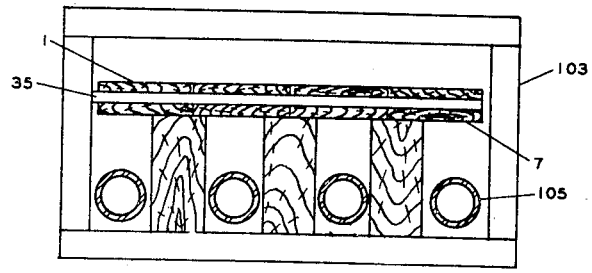

Fig. 14 is an end elevational view, through 14—14 of Fig. 4, showing details of the steam tunnel.

Figure 15:
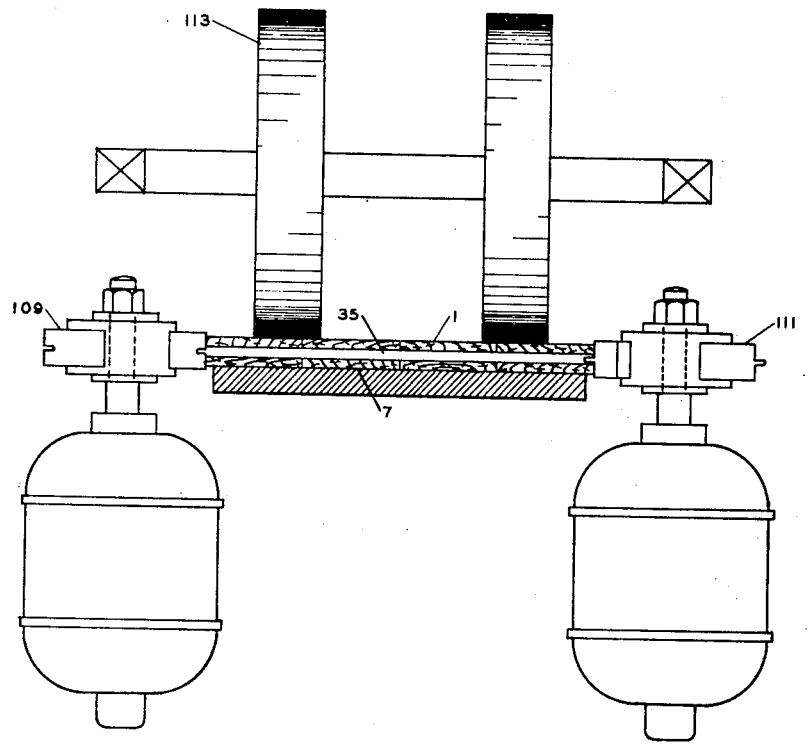

Fig. 15 is an end elevational view, through 15—15 of Fig. 4, showing details of the side matching mechanism.

In Figs. 1, 2, 5, 6 and 7, wooden slats 1 for a top ply of the three-ply laminated lumber being produced are manually placed on a traveling belt conveyor 3 which is provided with steel lugs 5 along its edges to hold the slats from moving transversely of the belt. Similarly, wooden slats 7 for a bottom ply are manually placed on a traveling belt conveyor 9 which is provided with steel lugs 11 along its edges to hold the slats from moving transversely of the belt. The conveyors 3 and 9 are driven at a speed somewhat faster than the speed of the finally assembled slats, thus tending to carry slats 1 and 7 forward so as to keep the forward end of each slat in close contact with the trailing end of the adjacent slat.

After the top ply slats 1 are placed on the conveyor 3, they travel until they pass under a gang of V-belts 13, which also travel somewhat faster than the finally assembled slats, thus adding to the force tending to keep a tight contact between ends of adjacent slats. The gang of V-belts 13 is pivotable in a vertical plane about its forward shaft 15, thus providing for a self-adjusting contact between gang of V-belts 13 and the slats 1 as determined by the weight of the gang of V-belts 13; and providing for the automatic raising (as well as manual raising) of the rear end of the gang of V-belts 13 in the case of any of the slats 1 becoming overlapped at their ends until such overlap may be corrected. Similarly, the bottom ply slats 7 on conveyor 9 pass under a gang of V-belts 17 which similarly tend to keep a tight contact between the ends of adjacent slats. The gang of V-belts 17 is pivotable in a vertical plan about its forward pulley shaft 19, thus providing for self-adjustment and automatic (and manual) raising similar to that provided for the gang of V-belts 13 for the top ply.

As the top ply slats 1 emerge from underneath the gang of V-belts 13, they pass under a group of slip-clutch equipped power driven fluted rings 21, all mounted on a common shaft, which exerts an even more definite force on the slats 1, tending to keep a tight contact between the ends of the adjacent slats. Similarly, as the bottom ply slats 7 emerge from underneath the gang of V-belts 17, they pass under a group of slip-clutch equipped power driven fluted rings, all mounted on a common shaft, which exerts an even more definite force, tending to keep the slats 7 in tight contact between the ends of the adjacent slats.

After emerging from the fluted rings 21, the top ply slats 1 pass over a glue spreader 25. The glue spreader used is of the roll type in which a roll of metal, or metal with rubber facing, carrying a coating of glue of controlled and adjustable thickness contacts the bottom surface only of the top ply slats 1, and deposits this coating of glue thereon. Similarly, after emerging from the fluted rings 23, the bottom ply slats 7 pass under a glue spreader 27. The coating of glue is deposited on the top surface of the bottom ply slats 7. After the glue is applied the top ply slats 1 and the bottom ply slats 7 pass through preheating tunnels 29 and 31, respectively, provided with resistance type electric heaters 33 and arranged to heat only the side of the slat opposite that coated with glue to a temperature of about 200° F. At this point the top ply slats 1 and the bottom ply slats 7 are made to converge toward each other, forming, along with the center ply slats 35, a three-ply slat assembly preparatory to entering the glue press proper. The converging of top ply slats 1 and the bottom ply slats 7 is accomplished by gradually bending and restraining the slats by means of several gangs of narrow width discs 37 mounted on spring held shafts 39. The discs 37 are so spaced that each disc of each gang of discs bears on the center of the top ply slats 1 or the bottom slats 7. Also, in this zone there are a number of horizontal rollers 41 located along each edge of the assembly of top ply slats 1 and along each edge of the assembly of bottom ply slats 7. These rollers 41 are arranged so as to force top ply slats 1 and bottom ply slats 7 snugly together along their longitudinal edges. The preheating in the tunnels 29 and 31 is to the extent that the heat applied will approximately just penetrate to the glue coated surface of the slats 1 and slats 7 by the time they emerge from the tunnels and become a part of the three-ply assembly 1—35—7, thus avoiding preheating and presetting of the glue.

While slats 1 and slats 7 may be random lengths, the center ply slats 35 are of the same length, which is approximately equal to the width of the lumber being produced, plus that required to provide the tongue in the finished tongue-and-groove laminated lumber. The center slats 35 are stacked in a magazine 43 from which they are automatically withdrawn one at a time by means of lugs 45 attached to traveling endless chains 47. The use of these lugs 45 for automatic feeding of the center ply slats 35 requires that a space be allowed between the slats at this point in the feed line. Shortly after the slats 35 are withdrawn from the magazine 43, they enter the heating tunnel 49 provided with resistor type heaters 50 where both the top and bottom surfaces of the center ply slats 35 are preheated to a surface temperature of about 200° F. The tunnel 49 extends to a point near where the top ply slats 1 and the bottom ply slats 7 begin to converge to form the three-ply assembly 1—35—7. No glue is applied to the center slats 35. Since they have no glue coating that might pre-set, these center slats are preheated to a considerable degree prior to their assembly with the top ply slats 1 and the bottom ply slats 7. After the center ply slats 35 emerge from the heating tunnel 49, they come in frictional contact on their top surfaces with a pair of endless chains 51; and in frictional contact on their bottom surfaces with a pair of endless chains 53. These chains 51 and 53 are driven at an adjustable speed somewhat greater than the speed of the final assembly 1—35—7, thus closing the gaps between individual slats 35.

In Figs. 3, 8, 9, 10, 11, 12, and 13, the slat assembly 1—35—7 is fed through a continuous glue press at a suitable speed, such as approximately 10 feet per minute.

In order to make certain that the several slats making up the width of the assembly are tightly contacting each other along their edges so as to avoid any tendency for longitudinal openings between slats of the finished product, two mechanical side pressure devices are provided. The side pressure devices consist of two endless roller chains 55 operating in a horizontal plane, one located along each edge of the three-ply assembly 1—35—7 and extending parallel to the slat assembly for a suitable distance, such as approximately 3½ feet, so as to confine the slat assembly transversely only until vertical pressure is applied through other means as will be hereinafter described. The two endless roller chains 55 do not operate on sprockets, but merely on eliptical shaped guiding tracks 56. The chains 55 along that edge of the slat assembly which is to be provided with a tongue (of the tongue-and-groove for lumber matching) is provided with lugs 57, each of which carries a groove 59 which has a proper width to receive one end of the center ply slats 35, thus permitting the center ply slats to project the correct amount for the later milling of the tongue. The chain 55 along that edge of the slat assembly which is to be later provided with a groove is equipped with lug 61 having no groove. This causes the ends of the center ply slats 35 along this edge of the slat assembly to remain flush with the edge of the assembly. When the groove is milled later, it is necessary to cut enough material from these center ply slats 35 along this edge of the slat assembly to form the groove. There is no special means of applying side pressure to these special chains 55. The side pressure exerted on the slat assembly is merely brought about by feeding the slat assembly of a certain aggregate width between the two chains 55 which are spaced at a somewhat less width, thus compressing the slat assembly. The side pressure chains 55 are driven only through their frictional contact with the slat assembly.

As the slat assembly 1—35—7 progresses further, it is subject to a substantial vertical pressure of the order of approximately 200 pounds per square inch, which pressure is maintained throughout the entire length of the glue press proper. This pressure is exerted by a bellows 63, which may be made of suitable material such as sheet metal, arranged to expand vertically upon the application of internal hydraulic pressure. The bellows 63 is provided with a curved form along its two edges so as to facilitate flexing without undue tendency toward crystallization of the metal of which it may be constructed. The upper and lower pressure exerting surfaces are provided with a steel plate 65 of somewhat thicker cross section. The lower of these plates 65 rests upon the lower main frame members 67 of the press. The upper of these plates 65 forms a path upon which operates an endless roller chain comprised of a series of rollers 69, of suitable dimensions such as 1⅜″ diameter x 12″ in length, carried at each end by roller chain 71. This endless roller chain 69—71 is to provide anti-friction travel through the continuous pressing zone.

Immediately above the endless roller chain 69—71 riding on the upper plate 65 is an endless chain of metallic platens 73, of suitable dimensions such as ½″ x 6″ x 14″ thick. The platens 73 are preheated along their lower or return portion. The preheating is accomplished by electric resistor heaters 75 mounted in a tunnel 77 through which this chain of platens 73 travels.

Immediately above and in contact with these heated platens 73, as they are traveling above the pressure bellows 63, is the slat assembly 1—35—7.

Immediately above and in contact with the slat assembly 1—35—7 is a traveling series of thicker metallic platens 79 which, on their upper surfaces, are provided with rack teeth 81. The platens 79, although not interconnected, travel in a circuitous path so that all platens return and reenter the pressure line through the pressure zone. These platens 79 are preheated during the return portion of their travel by being passed through a heating tunnel 83 provided with electric resistor heaters 75. Meshing with the rack teeth 81 of these platens 79 and prior to their entering the pressure line in the pressure zone is a power driven pinion 85, which forces the series of platens 79 through the pressure line of the pressure zone, as well as forcing the entire series back through its return travel.

Immediately above this series of platens 79, as they are traveling through the pressure line, is an endless chain of platens 87, similar to the platens 73 hereinbefore described except that they are not preheated.

Immediately above the chain of platens 87 is an endless roller chain composed of a series of rollers 89, carried at each end by a roller chain 91, respectively similar to rollers 69 and roller chain 71 hereinbefore described. The endless roller chain 89—91 rolls in contact with plate 33 forming the under surface of the upper main frame of the press.

Although the thicker platens 79 with the rack teeth 81 are the only ones driven directly or forced through the pressure line by mechanical means, the slat assembly and the other two endless platen chains as well as the two endless roller chains are all forced through the pressure line as the result of their frictional contact with these initially driven platens 79 or with one another. Neither the endless roller chains nor the platen chains travel on sprockets or wheels as they reverse directions near the ends of the pressing zone, but are merely passed around semi-circular guides 95. However, the endless roller chains, just prior to passing around the semi-circular guides 95 on their return travel mesh with sprockets 97.

The thicker platens 79 with the rack teeth 81 move from horizontal to vertical direction around revolving gear 99 following their emergence from the pressure zone, and another change in direction around a similar gear 101 from vertical to horizontal, immediately following the preceding change. At the opposite or intake end of the pressure zone, these thicker rack-toothed platens 79 merely pass through guides and slide down to their position of meshing with the drive pinion 85 due to their own weight.

The continuous press mechanism hereinbefore described is housed in a fire-proof insulated enclosure (not shown) provided with doors for convenient inspection, repair, and maintenance.

In Figs. 14 and 15, the glue-bonded slat assembly is further processed to produce the final laminated lumber product.

The glue-bonded slat assembly 1—35—7 is discharged from the pressure zone through a slot in the press enclosure. The slat assembly travels for a distance in tunnel 103 provided with steam coils 105 for providing heating for aftercure as may be required.

Upon leaving the tunnel 103, the bonded slat assembly passes through a side matching device which mills the tongue and groove on the edges of the slat assembly. This device consists of a power driven friction feeding mechanism 107 to keep the slat assembly traveling, power driven rotary cutters 109 and 111 for cutting the tongue and groove respectively, an adjustable roll assembly 113 for holding down the slat assembly during side matching, and exhaust ducts (not shown) for carrying away the wood cuttings.

In Fig. 8, Fig. 9 and Fig. 10 the details of the mechanism for guiding the assembled layers of slats through the continuous press in correct alignment is shown. Due to unavoidable minor irregularities in the diameters of the rollers 69 and 89 of the endless roller chains 69—71 and 89—91 and the possibility of the endless roller chains being started through the pressure line slightly out of alignment, there is a tendency for the assembly of slats to run off to one side or the other rather than to follow an absolutely straight path through the continuous press. Unless the assembly passes in a straight path through the continuous press, a sufficient strain in the links of the endless roller chains may cause their rupture. The method of applying correction to the respective upper and lower endless roller chains is similar, but is illustrated only for the upper endless roller chain 89—91. The steering device for the upper endless roller chain includes a tiltable sprocket shaft assembly, located near the intake end of the press, consisting of two sprockets 97, a shaft 117, two bearings 119 and 120, and two hinged bearing mountings 121. The endless roller chain 89—91 meshes with sprockets 97 just prior to passing around the semi-circular guide 95 for reversal of travel. The tilting of shaft 117 will steer the endless roller chain, which is loose at this position of travel, so that it will enter the pressure line at a slightly different position transversely of the direction of travel, and with the rollers 89 (69 for the lower endless roller chain) at a slight angle. This affects a correction of the excessive travel to one particular side, causing the endless roller chain to begin to work toward the opposite side. Actually, the endless roller chain keeps on working to the opposite side until it reaches the point of excessive travel in that direction, and is then corrected by an opposite tilt of the sprocket shaft. This hunting of the endless roller chain from one side to the other continues throughout the operation, but is arranged to operate automatically and within such limits that no excessive strains are thrown upon the endless roller chains, thereby causing the platens and slat assembly to travel substantially in a straight line through the press. It is to be noted that for purposes of illustration the angle of the rollers 89, corresponding to a raised position of bearing 120 and lowered position of bearing 119, is exaggerated.

The tilting of the sprocket shaft 117 is effected by an electric gear motor 123 which drives a shaft carrying two oppositely disposed eccentrics 125. The eccentrics are arranged so that, for steering in one particular direction, one eccentric will raise the hinge-mounted bearing 120 carrying one end of the sprocket shaft 117, and the other eccentric will lower a similar bearing 119 at the opposite end of the shaft 117. Each hinged bearing mounting 121 is provided with a roller 127 for contacting the surface of one of the eccentrics 125, and has a counterweight 129 for tending to move its associated bearing 119 downward. Whenever travel correction in the opposite direction is required, the eccentric which had previously raised the bearing 120 will permit it to lower and the one which had lowered the bearing 119 will now raise it.

In order to accomplish automatic control of the motor, and in turn of the entire steering operation, mechanical fingers 131 are provided, one along each edge of the series of thicker rack-toothed platens 79 as they travel through the continuous press, and at a distance of several feet in the direction of travel from the tiltable sprocket shaft 117. These fingers 131 are mechanically connected to electrical contacts 133 and are adjusted so as to permit a reasonable amount of side travel of the moving assembly of slats, platens and roller chains, and to make contact as soon as this assembly has reached a predetermined maximum allowable side travel. A contact thus effected by travel of this assembly in one particular direction will immediately start the gear motor 123 in the proper direction to cause steering of the endless roller chains toward the opposite side, after which a contact effected by the maximum travel in the opposite direction will start the motor in the original direction again so as to effect steering in the original direction.

It will be seen, therefore, that this invention actually may be carried out by the use of various modifications and changes without departing from its spirit and scope.

We claim:

1. A process for making three-ply laminated lumber from wooden slats of a thickness substantially greater than that of thin, flexible sheets of wood veneer which comprises: assembling a top layer of such slats having substantially equal widths and random lengths, disposed contiguously and longitudinally; separately assembling a core layer of such slats having substantially equal lengths and disposed transversely; separately assembling a bottom layer of such slats having substantially equal widths and random lengths, disposed contiguously and longitudinally; continuously moving the resulting assembled layers separately so as to converge into juxtaposition at the entrance of a lateral pressure zone; maintaining tight contact between ends of slats in said top and bottom layers during their movement to said pressure zone; applying a thermo-setting cement to the under side of said top layer and to the upper side of said bottom layer prior to their convergence at the pressure zone; heating the upper side of said top layer and the under side of said bottom layer prior to their convergence at the pressure zone; controlling the heating thereof so that thermo-setting cement applied to said layers is not set by such heating; heating both upper and lower sides of said core layer prior to the convergence thereof with said top and bottom layers at said pressure zone; continuously passing said layers in juxtaposition through said lateral pressure zone and under lateral pressure into a vertical pressure zone; passing said layers in superimposed juxtaposition through said vertical pressure zone under heavy vertical pressure; applying additional heat to the resulting assembly of layers in said vertical pressure zone; controlling the temperature, pressure, and rate of travel of said assembly in the pressure zones so that the thermo-setting cement is set in said vertical zone; and withdrawing a continuous strip of laminated lumber from said vertical pressure zone.

2. A process for making three-ply laminated lumber from wooden slats of a thickness substantially greater than that of thin, flexible sheets of wood veneer which comprises: assembling a top layer of such slats having substantially equal widths and random lengths, disposed contiguously and longitudinally; separately assembling a core layer of such slats having substantially equal lengths and disposed transversely; separately assembling a bottom layer of such slats having substantially equal widths and random lengths, disposed contiguously and longitudinally; continuously moving the resulting assembled layers separately so as to converge into juxtaposition at the entrance of a lateral pressure zone; maintaining tight contact between ends of slats in said top and bottom layers during their movement to said pressure zone; applying a thermo-setting cement to the under side of said top layer and to the upper side of said bottom layer prior to their convergence at the pressure zone; heating the upper side of said top layer and the under side of said bottom layer to about 200° F. prior to their convergence at the pressure zone; controlling the heating thereof so that thermo-setting cement applied to said layers is not set by such heating; heating both upper and lower sides of said core layer to about 200° F. prior to the convergence thereof with said top and bottom layers at said pressure zone; continuously passing said layers in juxtaposition through said lateral pressure zone and under lateral pressure into a vertical pressure zone; passing said layers in superimposed juxtaposition through said vertical pressure zone under vertical pressure of about 200 p. s. i.; applying additional heat to the resulting assembly of layers in said vertical pressure zone; controlling the temperature and rate of travel of said assembly in the pressure zones so that the thermo-setting cement is set in said vertical zone; and withdrawing a continuous strip of laminated lumber from said vertical pressure zone.

3. A process for making three-ply laminated lumber from wooden slats of a thickness substantially greater than that of thin, flexible sheets of wood veneer which comprises: assembling a top layer of such slats having substantially equal widths and random lengths, disposed contiguously and longitudinally; separately assembling a core layer of such slats having substantially equal lengths and disposed transversely; separately assembling a bottom layer of such slats having substantially equal widths and random lengths, disposed contiguously and longitudinally; continuously moving the resulting assembled layers separately so as to converge into juxtaposition at the entrance of a lateral pressure zone; maintaining tight contact between ends of slats in said top and bottom layers during their movement to said pressure zone; applying a thermo-setting cement to the under side of said top layer and to the upper side of said bottom layer prior to their convergence at the pressure zone; heating the upper side of said top layer and the under side of said bottom layer to about 200° F. prior to their convergence at the pressure zone; controlling the heating thereof so that thermo-setting cement applied to said layers is not set by such heating; heating both upper and lower sides of said core layer to about 200° F. prior to the convergence thereof with said top and bottom layers at said pressure zone; continuously passing said layers in juxtaposition through said lateral pressure zone and under lateral pressure into a vertical pressure zone; passing said layers in superimposed juxtaposition through said vertical pressure zone under vertical pressure of about 200 p. s. i.; applying additional heat to the resulting assembly of layers in said vertical pressure zone; maintaining temperature of said assembly in said pressure zone at not less than about 200° F. for a time sufficient to set said cement; controlling the rate of travel of said assembly through said pressure zone at about 10 feet per minute; and withdrawing a continuous strip of laminated lumber from said vertical pressure zone.

4. In an apparatus for making three-ply laminated lumber from wooden slats that combination which comprises means for separately advancing three continuous layers of slats, namely, an upper layer of longitudinally disposed contiguous slats, a core layer of transversely disposed contiguous slats, and a bottom layer of longitudinally disposed contiguous slats, into superimposed juxtaposition; means, cooperating therewith, for continuously applying a coating of cement to the lower side of said upper layer and to the upper side of said bottom layer prior to their convergence into juxtaposition with said core layer; means for heating the upper side of said upper layer, both upper and lower sides of said core layer, and the lower side of said bottom layer, shortly before the convergence of said layers into juxtaposition; means, cooperating with said means for advancing layers, for maintaining close contact between ends of slats in said upper and bottom layers; means, disposed adjacent to the point of convergence of said layers, for exerting lateral pressure upon the resulting assembly of layers in superimposed juxtaposition; and a continuous press having an entrance adapted to receive said assembly under lateral pressure disposed adjacent to said means for exerting lateral pressure; said press comprising in combination two vertically spaced cooperating elongated press jaws, namely, a fixed jaw and a movable jaw; vertically expansible fluid actuated means for exerting pressure disposed to support said movable jaw adapted to move the same toward said fixed jaws; two endless chains of rollers having cooperating runs and noncooperating runs, said chains being singly disposed, with one of said cooperating runs in contact with each of said press jaws; two endless chains of platens having cooperating and noncooperating runs, the cooperating runs thereof singly disposed between the cooperating runs of said chains of rollers and in contact therewith; a contiguous series of unconnected heavy platens having an internal run disposed between said cooperating runs of chains of platens and cooperating with one of the last-mentioned runs in receiving material to be pressed and an external run; means for heating said chain of platens cooperating with said series of heavy platens in its external run disposed adjacent thereto; means for heating said series of heavy platens in its external run disposed adjacent thereto; means for driving said series of heavy platens disposed adjacent to the entrance of said press; mechanical fingers spaced from the entrance of said press, singly disposed at each side of the run of heavy platens between the cooperating runs of chains of platens, responsive to lateral pressure from said run of heavy platens; and motor-driven means responsive to deflection of said fingers, comprising a shaft and sprockets attached thereto disposed to mesh with said chains of rollers in their non-cooperating runs, for steering said endless chains of rollers in their travel upon said press jaws.

ROBERT D. LAMBERT.
DANIEL W. SMITH.

REFERENCES CITED

The following references are of record in the file of this patent:

UNITED STATES PATENTS

| Number | Name | Date |
|---|---|---|
| 709,864 | Boenning | Sept. 30, 1902 |
| 868,157 | Bishopric | Oct. 15, 1907 |
| 1,851,709 | Laucks et al. | Mar. 29, 1932 |
| 1,870,041 | Dike | Aug. 2, 1932 |
| 1,916,134 | Dike et al. | June 27, 1933 |
| 2,071,999 | Dike | Feb. 23, 1937 |
| 2,191,070 | Cone | Feb. 20, 1940 |
| 2,291,650 | Robinson | Aug. 4, 1942 |
| 2,372,617 | Trew | Mar. 27, 1945 |
| 2,401,648 | Kahr | June 4, 1946 |
| 2,433,965 | Upson | Jan. 6, 1948 |